United States Patent
Mordukhovich

(10) Patent No.: US 8,161,953 B1
(45) Date of Patent: Apr. 24, 2012

(54) ADSORBENT STRUCTURES FOR REMOVAL OF WATER AND FUEL CONTAMINANTS IN ENGINE OIL

(75) Inventor: Gregory Mordukhovich, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/914,088

(22) Filed: Oct. 28, 2010

(51) Int. Cl.
 *F02B 77/00* (2006.01)
(52) U.S. Cl. ................. 123/572; 123/196 R; 123/196 A
(58) Field of Classification Search .......... 123/572–574, 123/41.86, 196 R–196 AB
See application file for complete search history.

(56) References Cited

U.S. PATENT DOCUMENTS

| | | | |
|---|---|---|---|
| 5,042,617 A * | 8/1991 | Brownawell et al. | 184/6.24 |
| 2002/0005191 A1 * | 1/2002 | Maeda et al. | 123/572 |
| 2008/0283019 A1 * | 11/2008 | Arakawa et al. | 123/196 R |

* cited by examiner

*Primary Examiner* — M. McMahon
(74) *Attorney, Agent, or Firm* — Reising Ethington P. C.

(57) ABSTRACT

Devices and methods for removal of condensed, blow-by contaminants with small molecular dimensions from the circulating lubricating engine oil of internal combustion engines, including automotive engines, with a positive crankcase ventilation system are disclosed. These condensable blow-by contaminants include water, alcohols and hydrocarbons with preponderantly seven or fewer carbon atoms. A macroporous structure comprising alumino-silicate particles with micro-pores is at least partially immersed in the circulating oil. The micro-pores are sized to adsorb the small, condensed, blow-by, contaminant molecules but not the larger oil molecules. The particles may be multi-layered, with an inner layer adapted for adsorption of polar molecules. Adsorption is most extensive at lower oil temperatures and decreases as the oil temperature increases. Thus at low temperatures the contaminant molecules may be adsorbed, removed from the oil and temporarily stored in the micropores. At high temperatures some of the contaminants will desorb and be re-incorporated in the oil. The desorbed contaminants will be carried with the higher temperature oil into the engine crankcase where they may vaporize and be removed by the engine positive crankcase ventilation system.

9 Claims, 4 Drawing Sheets

ADSORBENT STRUCTURES FOR REMOVAL OF WATER AND FUEL CONTAMINANTS IN ENGINE OIL

TECHNICAL FIELD

This invention pertains to devices and methods for temporarily adsorbing water and fuel contaminants from lubricating oil circulated in automotive internal combustion engines. More specifically, this invention pertains to the use of suitably-located crystalline particulate materials to adsorb such contaminants from relatively cold engine oil to extend oil life and to minimize potential corrosive damage to engine components. The contaminants are later released from the oil, for removal from the engine, when the engine is operating and the oil is relatively hot.

BACKGROUND OF THE INVENTION

Diesel, gasoline, and alcohol fueled internal combustion engines find broad application in both motor vehicles and stationary applications like motor-generators.

Many such engines use hydrocarbon-based, oil lubricating systems in which the oil is pumped during engine operation from an underlying reservoir, up and over the pistons, cylinder walls, inlet and exhaust valves, cranking mechanisms and other parts of the operating engine, and drained back through the crankcase and into the oil pan or sump. The circulating oil is pumped through an oil filter for removal of solids that are introduced into the oil by the combustion process or wear of engine parts. But water, and unburned or partially burned fuel constituents such as low molecular weight hydrocarbons, and/or alcohol are also introduced into the circulating oil. These liquid and vaporous materials are not removed by the oil filter and may reduce the useful life of the oil and have potential for causing corrosion of engine surfaces.

Such engines may also have a Positive Crankcase Ventilation (PCV) system which uses the engine air induction system to circulate air through the crankcase above the oil reservoir, to clear gases and vapors out of the crankcase and from the oil. These crankcase gases and vapors are inducted into the PCV airflow and carried, first, into the engine air inlet manifold, and then into the engine cylinders, where they may be consumed and exhausted from the engine.

Thus, in engine operation, some portion of the products of combustion and unburned fuel (water, alcohol, small hydrocarbons) mix with the circulated engine oil. When the engine has been operating long enough for the circulating oil to reach a temperature of for example, about 100° C., these contaminants are vaporized and continually removed from the oil and crankcase. But, during short term vehicle usages, the engine does not run long enough to heat the oil to temperatures high enough to expel such contaminants into the PCV system. The water, or alcohol, or fuel species remain in the oil where they may corrode engine parts.

Such low engine oil temperatures are commonly encountered on first starting an engine which has not been run for some period, but, of course, under most engine operating modes, this low engine oil temperature condition is temporary. With continued engine operation, the oil temperature will rise; the contaminants will substantially vaporize, accumulate in the crankcase, and be swept away by the PCV system.

However, in some circumstances and applications, an engine may be operated sporadically and for only short periods of time, resulting in a persistently low oil temperature. This condition may be encountered, for example, in a vehicle repeatedly used for infrequent short trips, or, in a hybrid-electric vehicle, where the auxiliary engine used to charge the battery is used only occasionally.

Under these conditions, the condensed contaminants may be retained in the engine oil for some appreciable period of time and contribute to premature oil degradation. There is therefore a need for improved methods of managing the concentrations of water, alcohols and low molecular weight hydrocarbons in oil, particularly at low engine oil temperatures.

SUMMARY OF THE INVENTION

In an engine of a motor vehicle, contaminants may be introduced into circulating lubricating oil by 'blow-by', where a portion of the gaseous combustion products and unburned fuel vapors in the engine cylinders are driven, under the high combustion pressures, between the piston rings and the cylinder wall and into the crankcase. At steady-state engine oil temperatures of about 100° C., these contaminants remain as gases and vapors and are removed from the crankcase by the Positive Crankcase Ventilation (PCV) system which, near-continuously, circulates ambient air to flush crankcase vapors.

At lower engine oil temperatures some of these contaminants may condense and remain in the engine lubricating oil and contribute to reduced oil life and engine damage. These condensed, blow-by contaminants comprise molecules of significantly lower molecular weight than the hydrocarbons and additives present in lubricating oil, and accordingly have smaller molecular dimensions. In accordance with embodiments of this invention, such relatively small, contaminant molecules may be selectively adsorbed from the oil by microporous crystalline solids, for example, zeolites, which may have, or may be formed to have, nanometer-sized pores of predictable and uniform dimension. Suitable volumes of such adsorbent zeolite particles may be placed, for example, in the oil circulation path or in the oil reservoir so that the oil contacts the adsorbent particles. The zeolites may adsorb and temporarily remove water, alcohol or hydrocarbon fuel from relatively cold oil so that such condensed contaminants are not circulated over engine surfaces. Later, when the oil is suitably heated by engine operation, the contaminants desorb from the adsorbent particulate material into the hotter oil and the contaminants are then vaporized and removed from the engine by normal operation of the engine's PCV system.

Zeolites are crystalline, micro-porous alumino-silicates which occur naturally, but are more commonly synthesized. These micro-porous materials can discriminate between molecules on the basis of size—small molecules may enter and be adsorbed in the pores, while large molecules, those whose molecular dimensions exceed the pore size, will be denied entry. This ability to discriminate between molecules on the basis of size may be used to discriminate between the long chain hydrocarbons and high molecular weight additives found in engine oil and contaminant molecules which are generally small and include water, ethanol, methanol and hydrocarbons with, preponderantly, fewer than seven carbon atoms.

Advantageously, the adsorbed molecules may be desorbed at elevated temperatures. Thus, zeolites(s) with an appropriate pore size, when immersed in, or in contact with, low temperature, say 20° C., oil, may adsorb substantially all or most of the condensed contaminants in the oil. As the oil temperature increases, adsorption of the contaminants becomes less favorable and some of the contaminants may be desorbed to again be incorporated in the oil. With continued increase in oil temperature, yet further contaminant desorption will occur, the vapor pressure of the contaminants will increase and contaminant gasses and vapors will accumulate in the crankcase where they may be permanently removed by the PCV system.

Thus, the zeolites(s) and the PCV system cooperate to minimize any deleterious effects of the condensed blow-by contaminants. At low oil temperatures the zeolites(s) serve to separate the condensed contaminants from the oil by adsorbing the contaminants within their micropores. With increasing temperature, the zeolites(s) will desorb the contaminants from the micropores and release contaminants back into the oil, but the increased oil temperature will promote more extensive vaporization of these contaminants so that they may be removed by the PCV system.

In one embodiment of the invention zeolite particles optimized for adsorption of water may be employed. Such zeolite particles may exhibit, in addition to a specified micropore dimension, a hydrophilic surface chemistry. Such a hydrophilic chemistry may be induced by selecting the ratio of silica to alumina in the zeolites; ratios of silica to alumina of preferably less than 10 and more preferably of between 1 and 3 will render the zeolite particles hydrophilic.

In a second embodiment multi-layer zeolite particles, with interior volumes of a first composition covered and surrounded by an outer layer or coating of a second zeolite composition may be employed. The outer zeolite layer of the particles will be non-polar and discriminate between molecules on the basis of only their size. Generally suitable zeolite compositions are those with a high silica to alumina ratio, generally greater than 10 and preferably ranging from 50 to 100. These comprise pores suitable for admission of low molecular weight hydrocarbon fuel components up to C7 olefins and C6 n-olefins, as well as methanol, ethanol and water.

The inner zeolite volume of the multi-layer zeolite particles may have particular affinity for polar contaminants such as water, methanol and ethanol. Thus, all contaminants will be accommodated in the outer layer of the multilayer particles, but the polar molecules will be drawn to the inner layer of each particle leaving the non-polar molecules occupying the outer layers. As noted previously, strongly hydrophilic behavior is observed in zeolites with low silica to alumina ratios, typically ratios of less than about 10 and preferably in ratios ranging from 1 to 3. Such a multi-layer configuration has benefit in ensuring that all classes of contaminants are sequestered in the multi-layer structure, minimizing the possibility that any one contaminant class will be disproportionately adsorbed.

Synthetic zeolites are generally prepared as small crystalline precipitates, usually by a sol-gel process. But individual precipitates may be agglomerated using a suitable binder to form readily-handled particles of substantially consistent size, for example about a millimeter or so. In both the first and second embodiments, it is preferred to further aggregate the particles to avoid introducing possibly abrasive particles into the vehicle oil circulation system. Hence the particles, with the aid of a binder material, may be bonded together to form a macroporous structure of micro-porous zeolite particles enabling easy entry of lubrication oil into the structure and thereby exposing the oil to a large surface area of the microporous zeolite particles to promote extensive interaction between the oil and the zeolite structure.

The macroporous structure may be carried in a suitable container for placement in any convenient location in the oil circuit so that oil may enter the container and contact the adsorbent particles. This structure is intended to adsorb and store contaminants generated during periods of low temperature operation until the oil next experiences higher temperatures. Thus a macroporous structure of multilayer zeolite particles may be suitably sized, subject to packaging constraints, to accommodate the contaminants generated between high oil temperature events. For example, the structure may be immersed in the oil pan, possibly secured to the oil pick-up tube, or positioned elsewhere in the oil circulation path, including, for example, incorporated into the oil filter, provided it is located downstream of the filtration media, so that it may not be clogged by particulates in the oil.

In this embodiment the adsorption and release of the contaminants from the macroporous multilayer zeolite particulate structure depends only on the temperature of the structure, or, since the structure is immersed in, and in intimate thermal contact with, the oil, the oil temperature. At any temperature the total concentration of contaminants will be partitioned between the porous structure and the oil in proportions dictated by the equilibrium constant for absorption of the contaminants and their relative concentration in the oil and the structure. At low temperatures the equilibrium strongly favors contaminant absorption. At high temperatures the equilibrium favors desorption of at least some of the adsorbed contaminant and the concentration of contaminant in the oil will increase. However, at elevated temperature any contaminant in the oil will have sufficient vapor pressure to be vaporized in the crankcase and carried from the crankcase by the PCV system. Because the PCV system provides a means of removing the contaminants, the concentration of contaminants in the hot oil can never achieve equilibrium with the porous structure and the porous structure will continue to desorb contaminants. Hence, only a modest difference in the absorptive capacity of the porous structure at low and high temperatures will, over time, drive the oil contaminant concentration to acceptably low levels.

In another embodiment of the invention, a structure of macroporous, multilayer zeolite particles may be rendered partially buoyant so that it may be only partially immersed in the reservoir of oil in the oil pan with a portion of the floating structure extending up into the crankcase. This may be accomplished, for example, by suitable addition of a buoyancy chamber to the structure. The portion extending into the crankcase will be in direct contact with the circulating gas flow in the crankcase.

In this configuration adsorption occurs due to the contact between the macroporous structure and cold oil. Desorption however may occur by two pathways; the first by desorption of contaminants in the immersed portion of the macroporous structure into hot oil, where, as before, it will vaporize and be released into the crankcase; the second pathway is by desorption of the contaminants from the portion of the macroporous structure extending into the crankcase directly into the crankcase.

In a further aspect of this embodiment, the portion of the macroporous multilayer zeolite structure extending into the crankcase may incorporate an internal heater. The heater may be employed to heat at least a portion of the macroporous structure to promote desorption of contaminants into the crankcase even at low oil temperatures when the oil-macroporous structure equilibrium would favor adsorption. The heater would be operated by a controller, responsive to sensor measurements of the oil or engine temperature, which would operate the heater only if the oil temperature was less than a threshold value. At temperatures greater than the threshold value, say above about 80° C., the macroporous structure may be heated by the heated oil as in the first embodiment.

In a yet further aspect of this invention the buoyant macroporous multilayer zeolite structure may be supported on a hollow structure such as a post incorporated into the oil pan. In this aspect the heater may be located in the hollow structure and out of contact with the oil but in thermal communication with the macroporous structure by conduction through the walls of the hollow structure. Again, the heater would operate only at low oil temperature and shut off when the oil reached its threshold value.

Other objects and advantages of the invention will be apparent from a description of preferred embodiments which follows in this specification.

DESCRIPTION OF PREFERRED EMBODIMENTS

Figure 1:
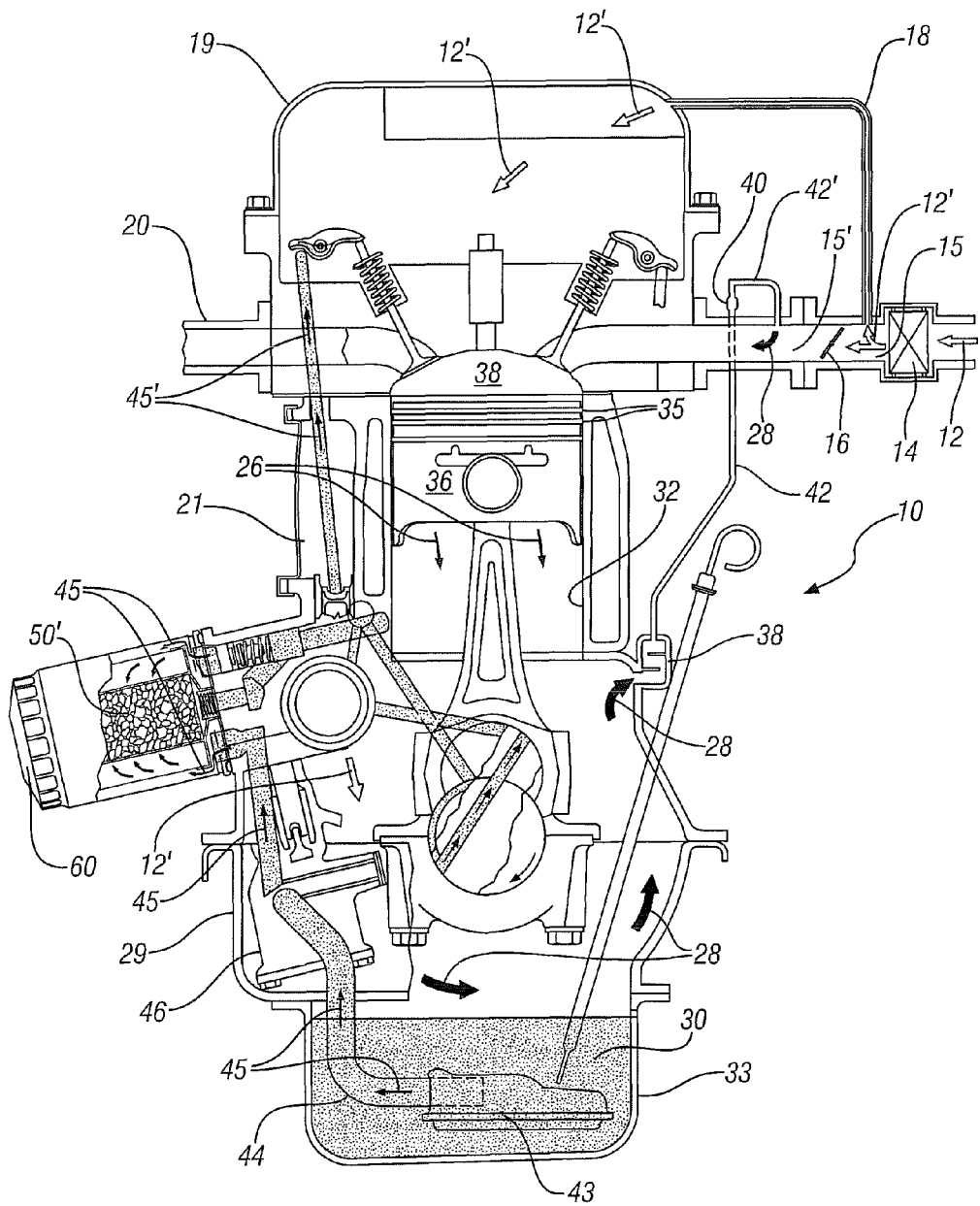
FIG. 1 shows, a schematic cross-sectional view of a vehicle engine illustrating the configuration and operation of a PCV system and an oil circulation system.

FIG. 1 shows, in cross-section, a schematic, partial-cutaway view of an automobile engine 10 with a positive crankcase ventilation (PCV) system. In operation of the PCV system, inlet air 12 is filtered by air filter 14 and enters inlet manifold 15. Before inlet air 12 encounters the constricted region of inlet manifold 15 established by throttle plate 16, a portion 12' of the inlet air 12 is diverted into breather hose 18 and transported via the cylinder head 19 and passages 21 into crankcase 29.

In the crankcase 29 inlet air 12' mixes with blow-by gases 26 expelled from the combustion chamber and introduced into crankcase 29 through the gap between cylinder wall 32 and the piston rings 35 of piston 36. The mixture of inlet air 12' and blow-by gases 26, shown as crankcase gas mixture 28, circulates in crankcase 29 before navigating breather chamber 38 and passing through PCV hose 42 and PCV valve 40.

After passing through PCV valve 40, the crankcase gas mixture is impelled through PCV hose 42' by the reduced pressure induced in the portion 15' of inlet manifold 15 downstream of throttle plate 16 for combination with inlet air stream 12. The gas and vapor mixture of inlet air stream 12, crankcase gas mixture 28 and fuel (not shown) is then carried into combustion chamber 38 where it is combusted and the products of combustion expelled through exhaust 20.

Also shown in FIG. 1 is oil pan 33 containing oil 30 whose surface is exposed to the flowing crankcase gas mixture 28.

When the engine 10 and oil 30 are at low temperature, blow-by gases 26 which may contain hydrocarbons and alcohols, such as methanol and ethanol, from unburned fuel, as well as water as a combustion product, may condense, at least in part. The condensed fraction may be incorporated into the oil, either as a solution or as a dispersion or emulsion. If the vehicle is operated for a sufficiently long period for the engine and oil to heat up to their normal operating temperature of about 100° C., these condensed liquids will vaporize, occupy the crankcase volume, be incorporated into airflow 12' to form crankcase gases 28, and carried out of the crankcase as described previously.

If, however, the engine and oil do not achieve a temperature at least comparable to, and preferably greater than, the boiling point of these condensed liquids, the liquids will be retained in the oil and may continue to accumulate if yet further vehicle operation under low oil temperatures occurs. The fraction of these condensed liquids in the oil after repeated low temperature operations may be significant. For example, about 240 miles of short trip winter driving in regions which experience below freezing temperatures, may accumulate up to about 18 weight percent of water and up to 12 weight percent of fuel in the oil. Prolonged retention of these contaminants may be deleterious to oil performance and life. Even with the warmer ambient temperatures encountered in these regions during spring, the same 240 mile schedule may result in oil with up to 5 weight percent of water and up to 11 weight percent of fuel.

Many of these condensed contaminants comprise low molecular weight, small-sized molecules and may be separated from the higher molecular weight, large sized molecules found in engine lubricating oils, on the basis of size, using micro-porous crystalline solids or molecular sieves. Microporous crystalline solids include both naturally-occurring and synthesized structures comprising nanometer-sized channels of predictable and consistent dimensions. The most common examples are zeolites. These materials can, therefore, discriminate between molecules on the basis of size. Small molecules, those with molecular dimensions smaller than the pore size, may enter the pores and be adsorbed, while large molecules, those whose molecular dimensions exceed the pore size, will be denied entry.

The hydrocarbon fuel fraction of the contaminants will comprise hydrocarbon molecules with a range of carbon atoms per molecule. Some of the hydrocarbon molecules may be large and difficult to separate from the oil and oil additive molecules. These molecules however are present in low concentration and sizing the pores to accommodate only up to hydrocarbons with 7 or fewer carbon atoms, for example up to C7 olefins and C6 n-olefins, achieves a satisfactory balance between discriminating between the oil and the hydrocarbon contaminants, and optimizing contaminant removal.

Yet further discrimination may be achieved by coupling a plurality of such porous crystalline solids with differing surface characteristics. For example, zeolites are porous crystalline alumino-silicates comprising assemblies of $SiO_4$ and $AlO_4$ tetrahedra joined together by shared oxygen atoms or ions. Most zeolites are ionic and have a high affinity for water and other polar molecules, but as the silica/alumina ratio increases the zeolite may become hydrophobic. Thus porous crystalline solids may be synthesized to 'tailor' their properties to modify both their pore size and their chemical selectivity.

Such zeolites may be synthesized by crystallization of a silica-alumina gel in the presence of alkalis and organic templates. This sol-gel process is compatible with the introduction of other solids, including metal oxides so that multi-layer zeolite solids may be formed by seeding a second sol composition with zeolite crystals derived from a first sol composition. These multilayer zeolite solids may then be aggregated, for example, by sintering or through the use of a binding agent, such as waterglass, in conjunction with thermal treatments, to form a macroporous multilayer zeolite structure. Such a macroporous multilayer zeolite structure comprising one or more, non-polar, micro-porous layers with pores sized to permit all targeted molecules to enter, may overlie one or more polar, micro-porous layers. The pores of the underlying polar layer may have a surface chemistry and size to selectively attract one or more of the polar molecules contained in the pores of the overlying non-polar pore structure. The structure need not be restricted to only two such porous crystalline solids. There may be advantage to incorporating additional porous solids to achieve yet further discrimination between adsorbate species.

Such a macroporous multilayer zeolite structure, if immersed in engine lubricating oil containing both polar and non-polar contaminants could serve to temporarily sequester the condensed contaminants within its porous layers. By appropriately sizing the total pore volumes of the polar and non-polar layers by adjustment of the layer thicknesses, the multi-layer structure may be fabricated to adsorb the contaminant species in general proportion to their anticipated concentration in the lubricating oil. That is, if the predominant contaminant were polar, the polar micro-porous layer(s) would comprise the bulk of the multilayer porous structure, and vice versa.

Figure 2:
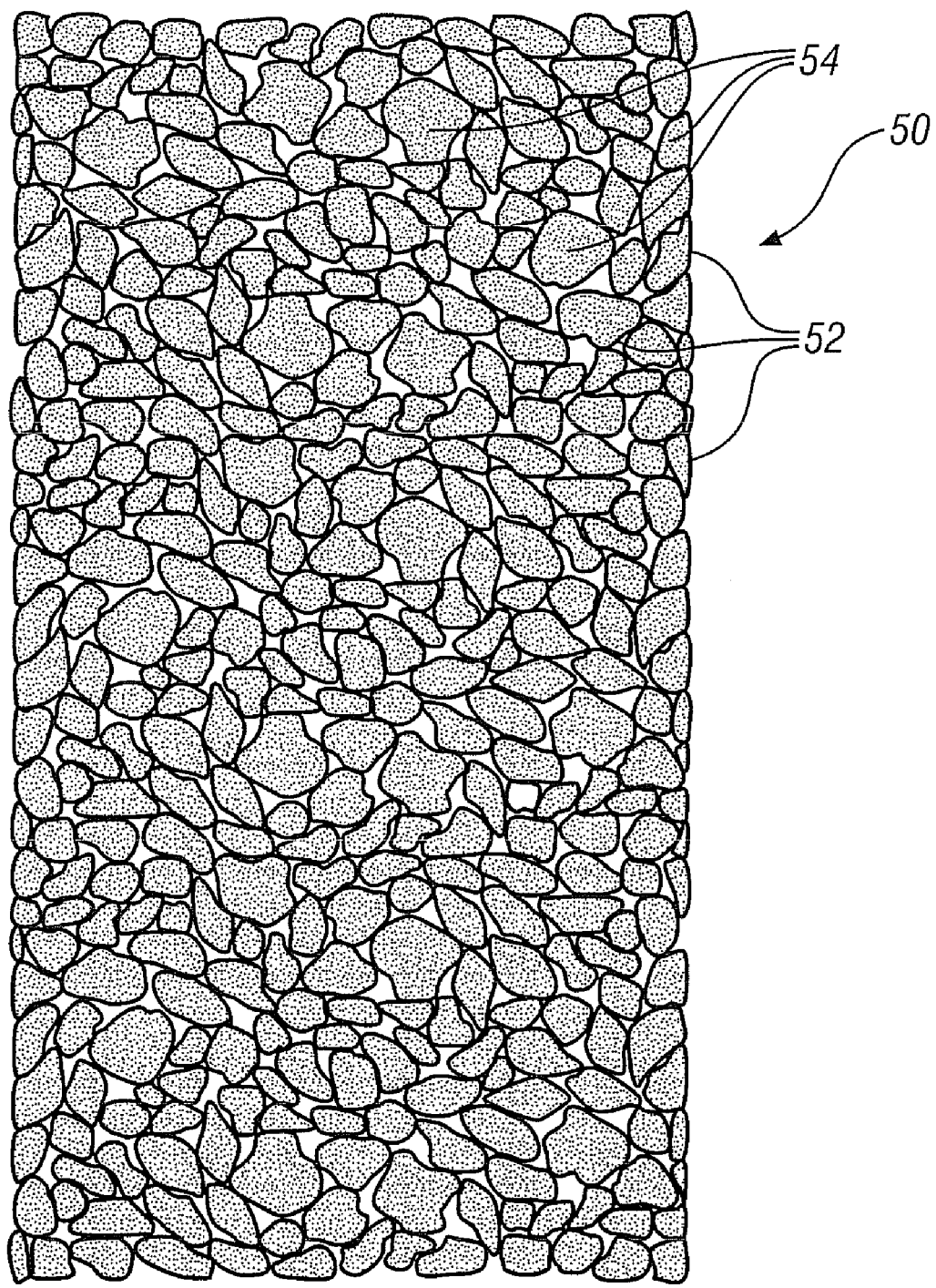
FIG. 2 shows, in cross-section, a representative multilayer porous crystalline solid.

A cross-section of an exemplary macroporous multilayer zeolite structure 50, suited for total immersion in lubricating oil is shown in FIG. 2. In this example only two porous solids have been employed but, the structure may readily be extended to incorporate additional layers or to individually embed a plurality of different such solids in a porous solid matrix. In the example shown, an outer shell of non-polar micro-porous crystalline solid 52 surrounds polar porous crystalline solid 54. The macroporous multilayer zeolite structure 50 is depicted as rectangular in cross-section, but it will be appreciated that it may be shaped to any convenient external configuration or cross-section as required.

A schematic overview of a typical vehicle engine oil circulation system is shown in FIG. 1. Generally oil 30 contained in oil pan 33 is collected by oil pickup 43 to flow, as indicated by arrows 45, through, sequentially, oil pickup tube 44, and oil filter 60 at the urging of oil pump 46. After passage through oil filter 60 oil the oil flows, indicated by arrows 45' to the cylinder head and, the main bearings among other engine locations, after which, impelled by gravity, it drains to oil pan 33 to repeat the circuit. If, for example, macroporous multilayer zeolite structure 50 is immersed in the oil 30 contained in oil pan 33 then it may exhibit a generally rectangular aspect and dimensions enabling it to stably locate in the bottom of oil pan 33. Alternatively such a macroporous multilayer zeolites structure 50 (FIG. 2) may be supported in oil pan 33 by oil pickup 43 (not shown) or by a bracket or other supporting structure (not shown). Another approach could be to secure a more irregularly-dimensioned macroporous multilayer zeolite structure to oil pick-up tube 44 (not shown). Yet another approach may be to position a more cylindrically-shaped macroporous multilayer zeolite structure 50' in the hollow oil return cavity of engine oil filter 60 as shown in FIG. 1, and, in more detail, in FIG. 3.

Figure 3:
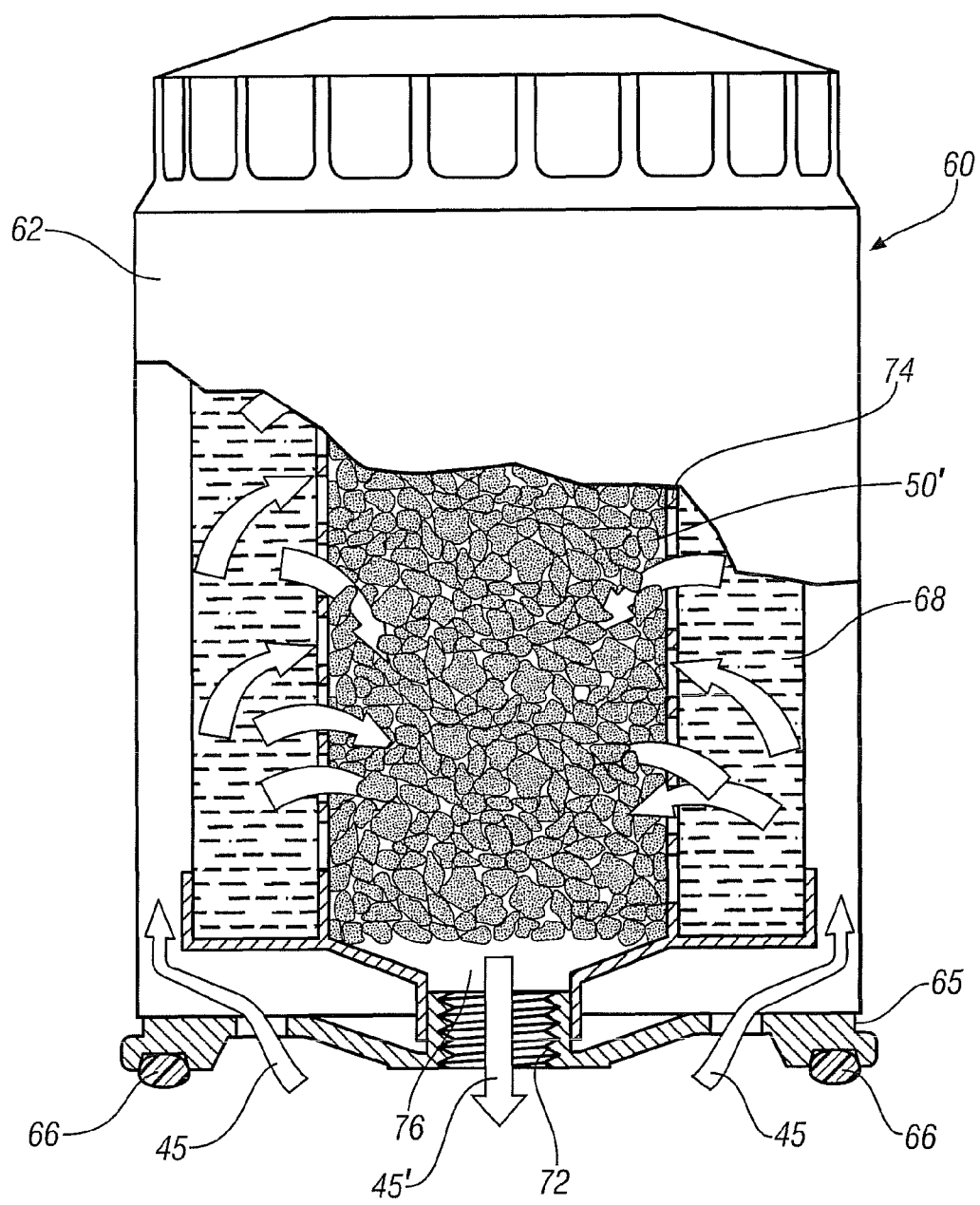
FIG. 3 shows, in cross-section partial cut-away view, a multilayer porous crystalline solid positioned in an oil filter.

The engine oil filter 60 shown in FIG. 3 is generally conventional. A domed cover 62 is attached to a baseplate 65 to define an interior volume partially occupied by filter medium 68, often of pleated fibrous construction, supported by a perforated cylindrical support 74. Baseplate 65 is sealingly secured against a mating engine block by engagement of threads 72 with a threaded hollow boss (not shown) in the engine block which, when tightened, compresses compliant seal 66 against the engine block to eliminate oil leakage. Oil enters the filter as flow 45 and is directed around and through filter medium 68, and perforated support 74, before passing through macroporous multilayer zeolite structure 50' which at least partially occupies interior cavity 76. After its exposure to macroporous multilayer zeolite structure 50' the oil exits filter 60 and re-enters the engine as flow 45'.

It will be appreciated from these examples that various modifications to the size, shape and diameter of the macroporous multilayer zeolite structure may be made, for example, to accommodate increased contaminant volumes or to accommodate the body to alternately-shaped locations, without departing from the intent or scope of the invention. Also the use of a plurality of commonly-located, or differently-located, macroporous, multilayer zeolite structures, of possibly different compositions, is also within the scope of the invention.

In these embodiments, the macroporous multilayer zeolite structure is immersed in the lubricating oil. The macroporous structure will therefore generally be at oil temperature and in chemical equilibrium with the oil. For a system at equilibrium, the liquid contaminants will be equilibrated between the macroporous multilayer zeolite structure and the oil according to a temperature-dependent equilibrium constant. At low temperatures, for example about 25° C. and below, equilibrium favors adsorption of the contaminants in the multilayer zeolites; at more elevated temperatures the equilibrium is less favorable to adsorption and some contaminants will be desorbed and enter the oil.

This difference in the adsorbed concentration at low and high temperatures need not be large to enable near-complete release of the adsorbed contaminants. The liquid contaminants in the oil seek to maintain equilibrium both with the adsorbed contaminants in the macroporous multilayer zeolite structure and also with contaminant vapors in the crankcase. But the crankcase vapors, including contaminant vapors, are continually carried away by the ambient air flushed through the crankcase by operation of the PCV system. This disturbs the liquid-vapor equilibrium and induces further vaporization of the liquids in the oil. But further vaporization of the liquids will reduce the liquid contaminant concentration in the liquid and disturb the macroporous solid-oil equilibrium. This, in turn, will result in further desorption of contaminant from the macroporous multilayer zeolite structure into the oil so that the sequence may be repeated.

At low oil temperatures, the vapor pressure of the condensed contaminants may be low. In this circumstance the PCV system, which removes the contaminants as vapor, may be less effective in removing contaminants. Thus the concentration of liquid contaminants may increase. But these liquid contaminants, may be largely adsorbed and sequestered in the macroporous multilayer zeolite structure with only a low concentration, dictated by chemical equilibrium, remaining in the oil. At more elevated temperatures the total contaminant concentration may be reduced in controlled manner by the progressive release of contaminants from the macroporous multilayer zeolite structure to the oil, followed by the vaporization of the contaminants in the oil for incorporation in crankcase gases and removal by the engine PCV system. Thus the multi-layer macroporous solid and engine PCV system cooperate to maintain a low level of contaminants in the oil for enhancement of oil life, over a wide range of engine operating temperatures, representative of many different driving cycles.

An alternative approach is to immerse only a portion of macroporous multilayer zeolite structure in the oil in the oil pan and allow the remaining portion of the multilayer porous solid to extend into the crankcase. It would be feasible to simply place the macroporous multilayer zeolite structure on a shelf or elevated platform in the oil pan (not shown) to elevate it and expose a portion to the crankcase. With such a fixed configuration however, it may be challenging to consistently maintain a preferred proportion of the macroporous multilayer zeolite structure immersed in the oil as the oil level changes, for example, due to consumption of oil during vehicle operation or sloshing of oil in the oil pan during vehicle maneuvers.

Figure 4:
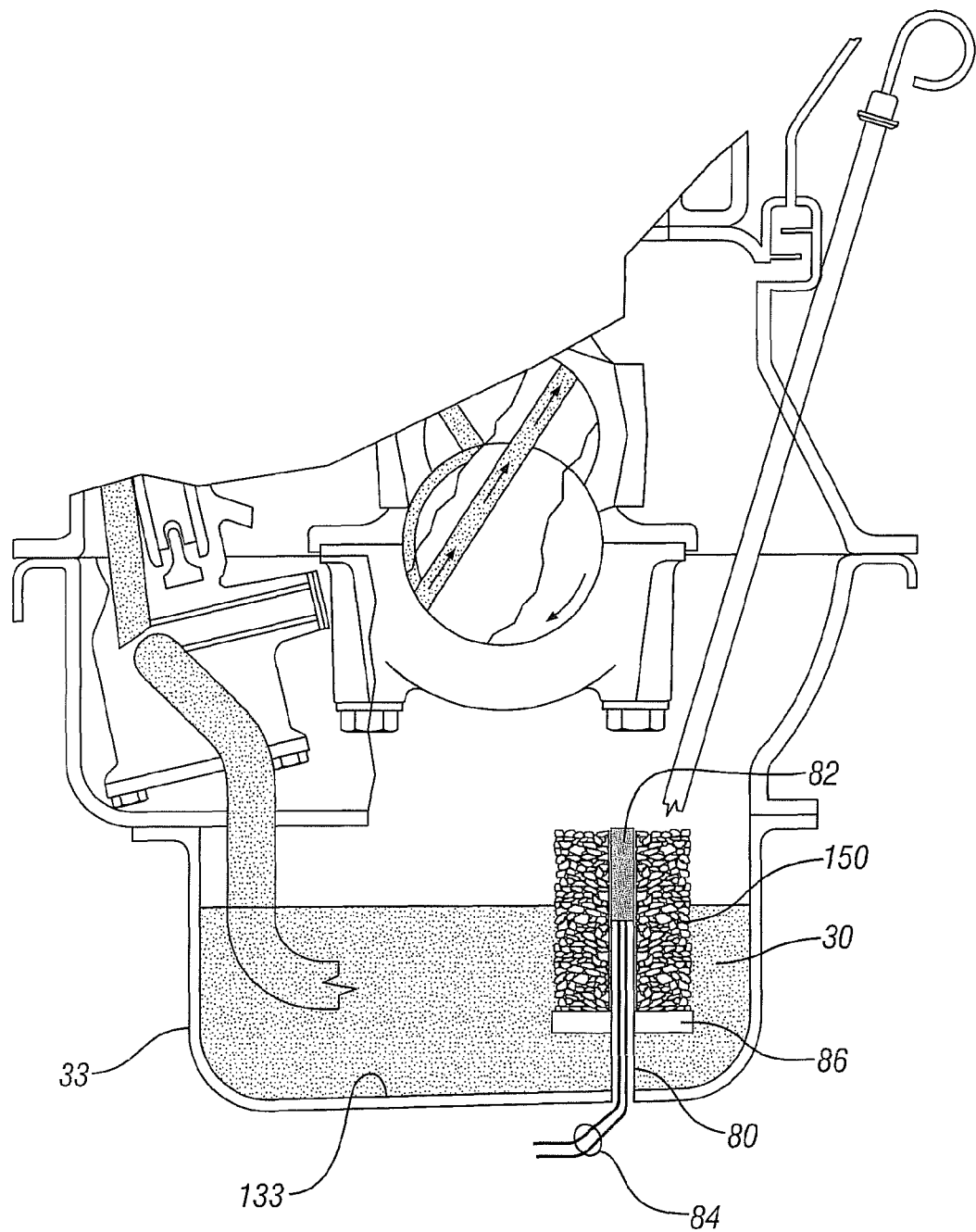
FIG. 4 shows a partial schematic cross-sectional view of the oil pan and crankcase of the engine of FIG. 1 illustrating the configuration and operation of a buoyant multilayer porous crystalline solid configured for placement in an oil pan and for thermal contact with an (optional) external heater.

A more preferred approach is illustrated in FIG. 4 which shows a macroporous multilayer zeolite structure 150 generally analogous to that shown in FIG. 2 and again comprising polar and non-polar microporous elements (not called out). Zeolites have a specific gravity of about 2.2 and, unless supported, will sink in oil 30 which has a specific gravity of about 0.9. However macroporous multilayer zeolite structure 150 may be rendered buoyant by addition of a buoyancy chamber, such as that identified as 86, or similar. When appropriately sized, buoyancy chamber 86 may stably maintain zeolite structure 150 partially submerged in oil 30 so that a portion of zeolite structure 150 extends into the crankcase.

In the embodiment shown, the porous solid and buoyancy chamber have the form of a hollow cylinder and are slidably positioned on a hollow post 80, extending near-vertically upward from the lower surface 133 of oil pan 33. Post 80 serves to laterally restrain macroporous zeolites structure 150 and buoyancy chamber 86 while enabling them to maintain a near-constant portion of macroporous multilayer zeolites structure 150 immersed in oil 30 even when the oil level changes.

By virtue of being only partially immersed in the oil, macroporous multilayer zeolite structure 150 may directly contribute some adsorbed contaminants to the crankcase gases for removal by the PCV system. There is therefore no need, during desorption, for at least some of the contaminants to transfer from the macroporous solid to the oil before passing to the crankcase for elimination by the PCV system.

Optionally, a heater 82, in thermal contact with the portion of the macroporous multilayer zeolite structure open to the crankcase may be employed to promote contaminant vaporization when the oil temperature is low. In the configuration shown, heater 82 may preferably be positioned, as shown, in the interior of hollow post 80. This enables electric supply wires 84 for heater 82 to be run outside the oil pan and crankcase.

Heater 82, if employed, would operate only at low oil temperature. A simple controller (not shown) would switch the heater off and on responsive to the oil or engine temperature. Under conditions where a vehicle is operated at normal oil temperatures the heater would not be required. But, under conditions where the engine oil temperature was below a threshold temperature the heater could promote desorption of contaminants and their removal by the PCV system to minimize their accumulation in the multilayer porous crystalline solid. Recollecting that a typical steady-state oil temperature is about 100° C., a suitable threshold temperature may be about 80° C.

The methods and devices of this invention have been described with specific reference to their application to cold weather, short trip operation of motor vehicles. It will however be appreciated that there are other applications where engines are used infrequently or for only short periods where the practices and devices of the invention may be advantageously employed. Examples include engines powering emergency generators and supplementary internal combustion engines used in hybrid vehicles, particularly extended-range, plug-in hybrid vehicles which, under most operating modes offer adequate range on battery power so that the supplementary engine is used only infrequently.

Hence, the listed embodiments are only intended to illustrate the invention and not to limit its scope.

The invention claimed is:

1. An internal combustion engine with a crankcase and a system for circulating lubricating oil, with a system for removal of condensed, blow-by contaminants from the circulating oil, the system comprising:

a positive crankcase ventilation system for removal of gases and vapors from the crankcase; and a macroporous structure positioned in the oil circulation system and at least partially immersed in the circulating lubricating oil;

the macroporous structure comprising a plurality of microporous particles of at least one alumino-silicate composition for selective, reversible adsorption of condensed blow-by contaminants from the lubricating oil;

the structure adsorbing greater quantities of contaminant at lower temperatures than at higher temperatures so that contaminant adsorbed by the structure at a lower temperature may be released to the lubricating oil at a higher temperature; and vaporized at the higher temperature to release contaminant vapors into the crankcase for removal by the positive crankcase ventilation system.

2. The circulating oil, condensed, blow-by, contaminant removal system of claim 1 in which the micro-porous particles are multi-layered, with an alumino-silicate of an inner composition substantially surrounded by an alumino-silicate of an outer composition.

3. The circulating oil, condensed, blow-by, contaminant removal system of claim 2 in which the inner alumino-silicate composition of the multi-layered micro-porous particles selectively adsorbs polar molecules.

4. The circulating oil, condensed, blow-by, contaminant removal system of claim 2 in which the inner composition of the multi-layered micro-porous particles comprises silica and alumina in a ratio of silica to alumina of less than 10.

5. The circulating oil, condensed, blow-by, contaminant removal system of claim 2 in which the inner composition of the multi-layered micro-porous particles comprises silica and alumina in a ratio of silica to alumina of between 1 and 3.

6. The circulating oil, condensed, blow-by, contaminant removal system of claim 1 in which the macroporous body is positioned in an oil pan of the oil circulating system.

7. The circulating oil, condensed, blow-by, contaminant removal system of claim 1 in which the macroporous body is positioned in an oil filter of the oil circulating system.

8. The circulating oil, condensed, blow-by, contaminant removal system of claim 1 in which at least a portion of the macroporous structure is heated by an external heater.

9. The circulating oil, condensed, blow-by, contaminant removal system of claim 1 in which the macroporous structure incorporates a buoyancy chamber to render the body partially buoyant.

* * * * *